United States Patent [19]

Koehne

[11] 4,421,797

[45] Dec. 20, 1983

[54] METHOD AND DEVICE FOR THE DRY-SPRAY APPLICATION OF CONCRETE TO A SUBSTRATE

[75] Inventor: Rainer Koehne, Mülheim-Speldorf, Fed. Rep. of Germany

[73] Assignee: Pressbau GmbH, Essen, Fed. Rep. of Germany

[21] Appl. No.: 302,449

[22] Filed: Sep. 15, 1981

[30] Foreign Application Priority Data

Sep. 16, 1980 [DE] Fed. Rep. of Germany ....... 3034851

[51] Int. Cl.³ .............................................. B05D 1/02
[52] U.S. Cl. .................................... 427/403; 427/421; 427/426; 118/300; 239/1; 239/61; 239/419.3; 239/427.5
[58] Field of Search ............... 239/1, 61, 427.5, 419.3; 427/403, 421, 426, 427; 118/300; 106/314, 90

[56] References Cited

U.S. PATENT DOCUMENTS

| | | | |
|---|---|---|---|
| 1,595,362 | 8/1926 | Schaefer | 427/426 |
| 3,030,664 | 4/1962 | Sodertalje | 427/403 |
| 3,354,169 | 11/1967 | Shafer et al. | 427/427 |
| 3,853,577 | 12/1974 | Nishida et al. | 106/90 X |
| 4,088,804 | 5/1978 | Cornwell et al. | 427/427 |

FOREIGN PATENT DOCUMENTS

| | | |
|---|---|---|
| 2706433 | 2/1976 | Fed. Rep. of Germany . |
| 2840874 | 4/1980 | Fed. Rep. of Germany . |
| 2302789 | 10/1976 | France ............................ 239/427.5 |

*Primary Examiner*—Shrive P. Beck
*Attorney, Agent, or Firm*—Karl F. Ross; Herbert Dubno

[57] ABSTRACT

A dry-spray concrete placement method in which a binder component utilizing a hydraulic, e.g. portland cement, an aggregate and water is applied to a substrate by a mixing nozzle. According to the invention, a portion of the binder component is formed by a liquid reactive resin which is activated or induced to react by a hardener component also applied with the mix.

8 Claims, 1 Drawing Figure

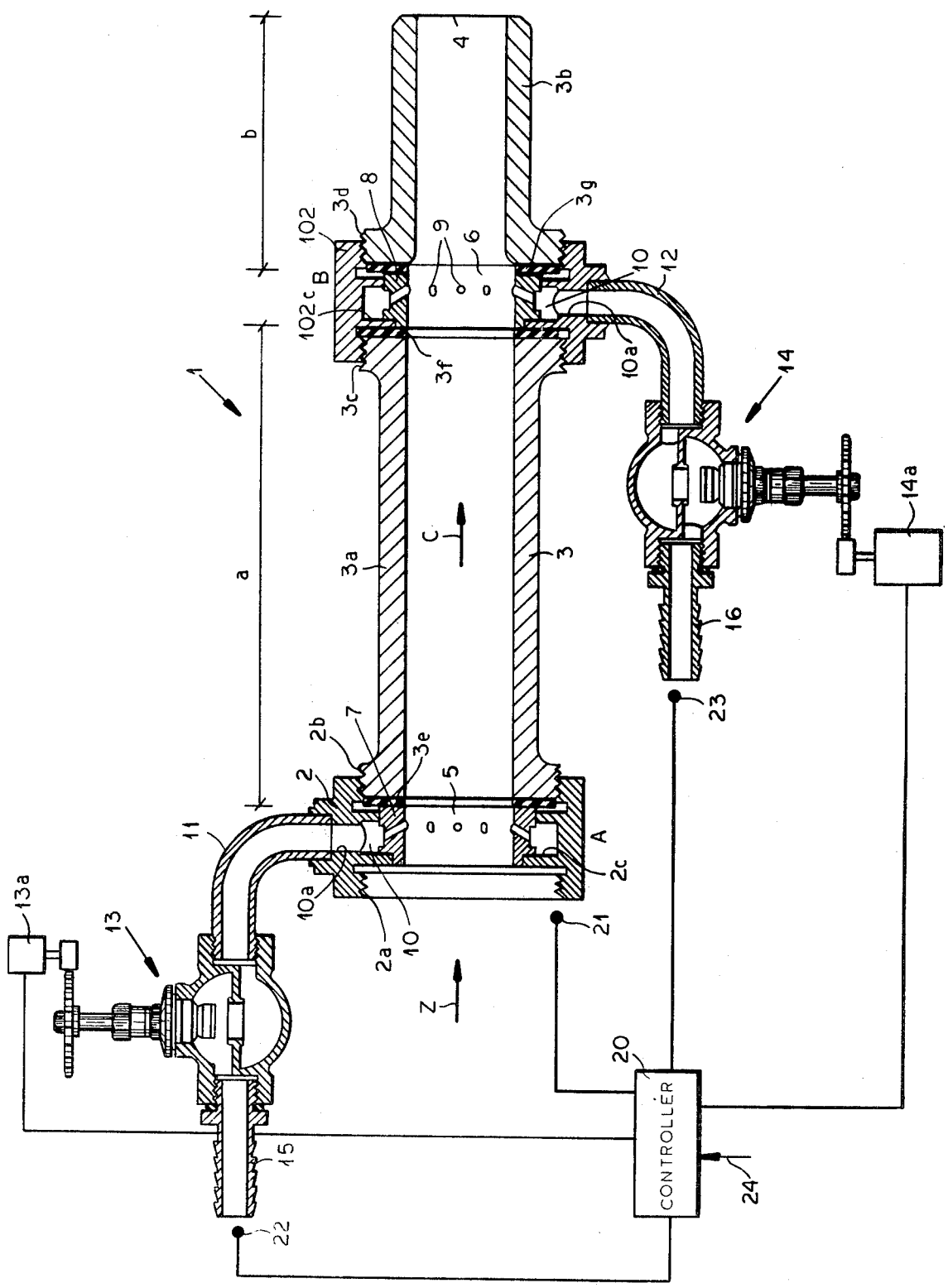

METHOD AND DEVICE FOR THE DRY-SPRAY APPLICATION OF CONCRETE TO A SUBSTRATE

FIELD OF THE INVENTION

My present invention relates to the dry-spray method of placing concrete upon a substrate and, more particularly, to a spray placement method and device whereby a dry mix of concrete can be applied to a substrate to form an improved coating or layer thereon.

BACKGROUND OF THE INVENTION

A concrete mix generally comprises, as the binder component, a hydraulic cement, e.g. portland cement, water and an aggregate component which may comprise sand and gravel granules in a suitable particle size range.

Such mixes are prepared to the desired consistency and can be applied by pouring to form concrete bodies and layers.

Frequently, however, it is desirable to utilize a spray placement method whereby a concrete deposit is formed on a substrate. Pneumatic spray techniques and air guns have been used in a wide variety of applications, for example, to repair mortar structures by driving the concrete mix into openings previously prepared to receive the mix, to coat metallic and other bodies to provide structural support or anticorrosion or antiweathering protection, for tunnel linings, for wall and ground structure stabilization and wherever the rapid placement of the mix in a dense layer is desirable.

Obviously the mix can be previously prepared and displaced by pumping to the placement gun or nozzle. The mix may have the appropriate consistency to allow it to flow and, generally speaking relatively fine aggregates, e.g. sand, may be required.

It is also known to apply the concrete composition to the substrate from a mixing nozzle in which a dry mix is combined with the requisite quantity of water to effect setting of the mixture. Such mixing nozzle guns can be used in a so-called dry-spray process.

One such technique is described in German patent document DE-OS No. 27 06 433 and, according to this publication, the binder consists either of the hydraulic cement or a synthetic resin material.

German patent document DE-OS No. 28 40 874 discloses a binder mixture or mortars which includes not only hydraulic cement but also an epoxy resin, a hardener and water.

Efforts to apply such mortars by conventional spray nozzles have, however, proved to be unsatisfactory since the nozzles were rapidly plugged presumably as a consequence of premature setting of the epoxy/hydraulic cement binder component in the presence of the water hardener or activator.

Much may also be made of the efforts described in the placement of concrete by a dry-spray process described in the journal *Bauwirtschaft*, issue 5, page 121 (1975). In this process, a dry mix of the aggregate and the cement is fed under pressure to a mixing nozzle and only there combined with the water.

I have extensively investigated the use of the dry spray process as described in the aforementioned journal for composition containing synthetic resin materials as part of the binder component and have discovered that significant problems arise because of the high viscosity of the resin which prevents thorough mixing with the other components, because of premature setting resulting from localized reactions of the resin with the activator or hardener and because of difficulties in feeding the resin and hardener components to the mixing nozzle when the latter is of conventional design. Furthermore, while the problem is solved by omitting, say, hydraulic cement in the system and spraying only a composition of synthetic resin, hardener and aggregate, the resulting compositions are inordinately expensive and far more expensive, for example, than cement glues or grouts. Prior intensive mixing of the resin with other components of the concrete have been attempted without successfully solving the problems.

OBJECTS OF THE INVENTION

It is the principal object of the present invention to provide a highly economical concrete placement method which obviates the disadvantages of earlier systems, enables controlled amounts of reactive synthetic resin to be incorporated uniformly in the concrete, and does not require frequent cleaning or maintenance of the equipment.

Another object of the invention is to provide an improved method of placing a concrete composition with reduced rebound effect, increased adhesion to the substrate and better distribution of the synthetic resin binder component.

Still another object of my invention is to provide an improved device for applying a concrete composition to a substrate.

SUMMARY OF THE INVENTION

These objects and others which will become apparent hereinafter are attained in accordance with my present invention, by a method of placing a concrete composition in which a dry mix including at least a spray-distributable aggregate, is combined with a binder component which includes a flowable reactive (settable bonding-type) synthetic resin in a mixing nozzle to which water is also added to form the final mix, the latter being projected against the substrate to form a layer of concrete thereon, the activator or hardener for the resin also being added within the mixing nozzle or body.

Thus the invention is a method of making dry sprayed concrete in which hydraulic cement, as part of the binder component, water and an aggregate, especially as a dry mix, is fed to the mixing nozzle or body. The improvement involves the use of a liquid reactive resin as part of the binder component, in addition to the hydraulic cement, and to provide a hardener or activator for this reason.

The method of the present invention results in a double-bonding in the concrete composition and the latter can be referred as a double-bonding matrix inasmuch as the synthetic resin components bond not only to the hydraulic cement/aggregate hydrate but also to the substrate and to the particles of the hydraulic cement and aggregate while the hydraulic cement binder/aggregate hydrate appears to physically and chemically bond to the synthetic resin component as well.

The process of the invention permits precise control and variation of the proportions and rates of admixture with the aggregate during the spray placement process. For example, the user can react directly to the changes in the properties of the fresh concrete being applied and, for example, can respond to excessive rebound of the mixture from the substrate, excessive dispersion of the spray or excessive slip of the concrete composition.

The response will generally be in the form of a variation of the liquid feed rate and proportion. For instance, if excessive slip is noted, indicating an excessively loose consistency, the resin component can be increased and the water or cement quantities decreased.

Another advantage of the system of the invention is that it allows differing compositional layers to be applied with an intimate bonding between them and practically without a discernible interface since the different compositions are applied continuously with one another so that there never need by any concern with respect to proper bonding between the compositions.

Thus, with the present invention, it is possible to apply an exceptionally highly adherent first layer by utilizing a high proportion of the synthetic resin component and then, without interruption, to apply successive layers with reduced proportions of synthetic resin and increased proportions of hydraulic cement.

The synthetic resin component need not be uniformly distributed throughout the thickness of the applied layer but can be varied in accordance with requirements or desiderata so that resin can be conserved and replaced by hydraulic cement, whenever appropriate, to decrease the cost.

The method of the present invention has been found to be highly effective in repair and restoration of concrete structures, for the application of protective layers resistant to aggressive media, for the application of coatings and the like for sealing purposes and for the fabrication of thin-wall and complex structural elements. The spray nozzles, piping and control devices are not contaminated or plugged and problems with deposits within these devices are avoided.

In some cases it may be desirable to utilize a high synthetic resin proportion in the outermost or upper layer when, for example, the concrete coating or layer is to be resistant to acid or base and in this case, the high-resin layer can be applied to an underlying layer containing no resin or only a small proportion of resin. The transition between the two layers is preferably continuous and this is accomplished by gradually increasing the resin or resin/water emulsion proportions during the spray placement.

In other cases it may advantageous to include smaller proportions of the resin in the outermost layer when, for example, grinding or polishing of the outermost layer is to be effected.

The present invention also has the advantage that it allows optimum water or water/resin emulsion proportions to be provided in a concrete mix, precludes foaming and enables controlled diminishing of the hardening time in spite of variable environmental factors such as temperature.

The economic factors have previously been discussed and will be found to include a considerable saving because of the ability to reduce the resin emulsion proportion wherever possible and because it allows sealing directly with the composition rather than by the use of special synthetic resin sealants. Naturally, the composition can include steel or other fibers to provide additional strength. The product has been found to have little tendency to crack and to be highly adherent to old concrete and most substrates such as earth embankments and rock. The composition can have an early setting strength and is highly adherent in the sense that the adhesive quality is retained for long periods of time. The hardened composition can have a relatively high modulus of elasticity and resistance to rupture under vibration and oscillation stress as well as comparatively high tensile, compressive and bending stress. It can resist moisture and other fluid penetration.

A saving in resin for a given proportion of the binder component and hence a given strength can be achieved, in accordance with the invention, when, with reduction in the resin or resin/water emulsion proportions, the quantity of cement glue (neat cement or grout) is increased. The total liquid proportion can thus be held constant for a given aggregate proportion.

It has been found to be advantageous to continuously vary the proportion of the resin or resin/water emulsion during the spray emplacement of the concrete, thereby obtaining the advantage that the transitions between various zones of the applied concrete are free from boundary layers and successively applied layers homogeneously merge with one another.

I have found, further, that best results are obtained when application is made to a moist surface substrate and this is especially advantageous in the lining or stabilizing of the walls of tunnels and for refinishing concrete walls or structures. When such structures are composed of reinforced concrete, the applied layer affords additional corrosion protection and renders the underlying body especially resistant to weathering phenomena.

If water or the cement glue proportions are continuously reduced and the resin proportion raised, a pure resin concrete composition will ultimately be obtained which can form a final protective layer.

This layer bonds especially uniformly and strongly to the underlying concrete compositions which include the hydraulic cement binder in accordance with the invention.

According to a feature of the invention, the liquid fraction of the sprayed mix is supplied to the mixing valve in two components, at spaced-apart locations along the path of the mixture through the elongated mixing chamber ahead of the discharge nozzle. For example, the dry mix or at least a component of the dry mix is fed into this chamber at one end thereof, is mixed with a first liquid component, preferably containing the synthetic resin, and then encounters the second liquid component which preferably contains water. Of course, where water is supplied in the first component, the second liquid component can be the liquid resin.

The liquid resin of the present invention can be added directly, i.e. as the resin itself in liquid form, or in the form of an emulsion in water, in which case the water, which can constitute the dominant phase of the emulsion, can provide a substantial contribution or all of the water needed for the final mix. When the continuous phase of the emulsion is the liquid resin, the water forming the disperse phase may have to be supplemented by additional water at the first or second liquid entry point to achieve the requisite amount of water for the final mix. In other words, the invention provides for two spaced additions of liquid with the second liquid addition meeting the aggregate stream at a location downstream from the first liquid addition.

I have found that the two-part addition of liquid to the aggregate or dry mix, with one of the liquid streams including the resin and the same or the other liquid stream including the cement and/or the hardener or activator, results in an especially intimate mixing of the liquids with the dry component which can include hydraulic cement in addition to the aggregate.

In the following description, reference may be made to first and second liquids and it should be understood that these designations are not intended to be limiting in terms of the point at which the liquid meets the dry component. For example, the first liquid can meet the dry component at an upstream location and the second liquid at a downstream location and vice versa.

The first liquid can be a resin/water emulsion and a water emulsifiable resin has been found to be an especially effective binder component in the dry-spray placement method of the invention. For example, binder components such as epoxy resins form especially stable water emulsions and intensively wet and combine with the dry components supplied under compressed air.

In a particularly advantageous embodiment of this invention, the emulsion can consist of a third by volume of the liquid resin and two thirds by volume of water.

Water-emulsifiable epoxy resin systems have been found to be compatible with hydraulic cements, sand, gravel and other components normally in the separated mix. The system can operate with expensive and special aggregates, e.g. predried and prepackaged aggregates, as well as dry mixes prepared in advance and packed, including sand and hydraulic cement.

Expensive and time-consuming preparation methods can be eliminated and, indeed the dry component itself may carry along with it adherent or natural moisture so that it can initially have the consistency of so-called "dry pack" mixes.

Emulsified resins of the type described have been found to be especially effective in creating adhesion in the newly applied composition and the old concrete, with respect to improving the wear resistance and strength of the applied composition and in creating a resistance to corrosion, erosion and chemical attack.

The compositions can be used wherever application of a concrete or concrete-like coating may be desirable and even in places in which hydraulic concrete/grouting/mortar composite coatings have been found to be unsatisfactory or where epoxy resin coatings alone are too expensive.

In all of the cases described herein it is possible to include all or part of the hydraulic cement component in the resin/water emulsion. Thus the hydraulic cement can be mixed with the aggregate to form part of the dry component and/or mixed with the resin/water emulsion to form part of the first liquid component and/or mixed with liquid resin or with make-up water to form part of the second liquid component.

When the resin/water emulsion forms the first liquid component, the hardener is included in the second liquid component in the preferred mode of carrying out the invention.

It has been found to be advantageous to form the second liquid component, therefore, as water, cement glue or grout (neat cement) and/or a liquid hardener. Of course, all water, cement or resin content of the second liquid component will be diminished to the extent that the first liquid component contains them.

This arrangement has the advantage that the hardener does not meet the resin until the final mix is formed in the nozzle so that premature setting of the resin is avoided. Furthermore, rapidly acting hardeners can be used to expedite setting of the concrete.

Advantageously, at least one of the liquid inlets can be left free from introduction of cement or a liquid containing the hydraulic cement by either incorporating all of the hydraulic cement with the aggregate or partly including some of the cement in the aggregate and introducing the balance through the other liquid inlet.

When the cement is not included in the dry component with the aggregate, it is preferably introduced in the form of hydraulic cement slurry in a liquid, e.g. as cement glue, neat cement or grout, since these can be metered precisely with respect to the resin or to the resin water emulsion which is fed to the system.

Various types of hardeners can be used according to the invention. For example, I may make use of a hardener which can be added to the resin before the resin encounters the dry component. Preferably, however, the hardener is added separately through the second liquid inlet since this permits precise metering of the hardener and precludes premature setting of the resin. Of course, when the hardener is a powdery material it can be inclined in the aggregate or dry component as well.

It has been found to be advantageous, moreover, to provide an agent for activating the hardener or initiating its interaction with the resin, e.g. an accelerator, and to introduce this through the first and second liquid inlets.

When the hardener is an alkali medium, the hydraulic cement itself forms an activator for the hardener and especially effective results are obtained. In many cases it has been found to be advantageous to introduce the make-up water required for the spray composition separately from the resin or the resin/water emulsion. This facilitates control of the proportioning of the various ingredients.

When the resin or a resin-carrying liquid is combined with the dry component before the make-up water is added, there is less danger that the make-up water will result in the separation of the mix to produce a cement-rich liquid phase or to concentrate larger particles separately from smaller particles of the aggregate. The mix, therefore, is significantly more uniform.

The dry component can include glass and/or steel fibers which increase the tensile strength of the concrete and reduce the tendency toward cracking. I have discovered, quite surprisingly, that the addition of such fibers decreases rebounding from the substrate surface, dispersion losses and slippage of the mix.

According to another aspect of the invention, the device for mixing and dispensing the concrete mixture comprises an elongated mixing body formed at one end with an inlet for the dry component which is pneumatically driven through the body and a nozzle or outlet at the opposite end for discharging the dry-spray mixture. According to the invention, an annular nozzle ring is provided at the inlet end of the body with the orifices of this ring communicating with a first liquid source. At a location axially spaced from this ring, a second ring is provided with orifices communicating with a second liquid source, the orifices of both rings being inclined in the direction of flow of the mixture therethrough and nozzle rings can advantageously be interchangeable, identical and of the same diameter. The body can be provided with means which can be threaded on the body to allow replacement of the nozzle rings if they become contaminated and it has been found to be advantageous to provide the spacing between the two nozzle rings such that it is greater than the spacing between the second ring and the mixture outlet body.

This enables the first liquid to mix with the dry component for a longer period than the second liquid which is important if the first component includes the resin because of the greater viscosity of the resin.

The flows of the two fluids can be effected by respective control valves operable by hand although it is advantageous in many cases to provide means for synchronizing the operation of the valves so that the two liquids are fed with a predetermined dependency with respect to one another.

BRIEF DESCRIPTION OF THE DRAWING

The above and other objects, features and advantages of the present invention will become more readily apparent from the following description, reference being made to the sole FIGURE of the accompanying drawing which is an axial cross-sectional view through a mixing nozzle.

SPECIFIC DESCRIPTION

The mixing nozzle 1 shown in the drawing has a sleeve 2 which is internally threaded at 2a so that it can be removably mounted on the end of a pipe, not shown, supplying the dry component which can be pneumatically-conveyed aggregate of a mixture of the aggregate and the hydraulic cement as represented by the arrow Z.

The dry component, i.e. the aggregate alone or in admixture with powder hydraulic cement (usually portland cement) with or without a powdered hardener, can be supplied by any conventional metering device pneumatically through gates, rotary-pocket feeders, worms or the like.

Preferably the dry component is supplied through a flexible hose connected coaxially at the thread 2a. The sleeve 2 is also formed with thread 2b into which one end of a tubular body 3a is screwed removably, this body holding a nozzle ring 5 in place against a shoulder 2c of the sleeve and forming one member of the nozzle body whose other member 3b has an outlet 4. The internal diameters or members 3a and 3b are the same and the nozzle rings 5 and 6 have the same internal diameter as well.

At its end remote from the inlet, the tubular member 3a has a thread 3c which is screwed into another sleeve 102 against a shoulder 102c of which the nozzle ring 6 is held by the threaded portion 3d of member 3b which likewise is screwed into the sleeve 102. Thus the sleeves 2 and 102 and their respective nozzle rings 5, 6 can be identical, interchangeable, removable and replaceable.

The nozzle ring 5 forms a first location A at which a first fluid is admixed with the dry component, with mixture flowing in the direction of arrow C to a second location B at which the second fluid is introduced, the mixing region a being greater than the mixing region b.

The nozzle rings 5 and 6 are formed as annular members 7 and 8, respectively, coaxially with the mixing body 3 and provided with orifices 9 which are inclined in the flow direction as can be seen in cross section in the drawing.

Sealing disks 3e, 3f and 3g are provided between the clamped ends of members 3a and 3b and the respective sleeves 2, 102 or the rings 5 and 6 held therein.

Each of the sleeves 2, 102 is formed with an inwardly open annular channel 10 communicating with the orifice 9 and with respective radial bores 10a communicate, in turn, with pipes 11 and 12, each of which is fitted with a valve 13, 14 which can have a handwheel for flow control. The liquid inlets to these valves are provided with fittings 15 and 16 over which hoses running to respective pumps can be placed.

While the device can be controlled fully manually by operation of the valves 13 and 14, it is frequently advantageous to provide servomotors 13a and 14a for driving these valves in response to a controller 20 which adjusts the valves reciprocally or in accordance with a predetermined relationship to increase the water or resin emulsion component while reducing the make-up water component, for example.

It has also been found to be advantageous to provide flow sensors as represented at 21, 22 and 23 as inputs to the controller 20 and to respond to the volume rate of flow of the dry component and each of the liquid components when feedback control to establish a particular mix is desired. The selection of the mix can be effected by an input 24 to the controller.

Preferably the liquid introduced at the first location is the liquid resin or a resin/water emulsion or an emulsion also containing the hydraulic cement. At the second location preferably make-up water, neat cement and/or a hardener is introduced.

Seven different modes of operation of the device are represented in the following table:

TABLE

| Z | A | B |
| --- | --- | --- |
| 1. Aggregate + Cement | Water/Resin-Emulsion | Water |
| 2. Aggregate + Cement | Water/Resin-Emulsion | Liquid Hardener |
| 3. Aggregate | Water/Cement/Resin--Emulsion | Liquid |
| 4. Aggregate | Water/Resin-Emulsion | Grout |
| 5. Aggregate | Liquid Resin | Grout |
| 6. Aggregate | Liquid Resin | Water |
| 7. Aggregate | Liquid Resin | Liquid Hardener |

The hardener for the resin in modes 1, 4, 5 and 6 is either incorporated directly in the resin or added as a liquid either at locations a or b or mixed in a powder form with the aggregate. The activator for the hardener is either the cement itself or added at any of the locations.

The two valves 13, 14 can be replaced by a single mixing valve whose mixing chamber opens into the body 3 and is controlled by hand or by an electrical, hydraulic or pneumatic drive by any conventional control system.

EXAMPLE 1

Z:

1650 kg Aggregate sand up to 8 mm particle size 400 kg Portland cement 35 F

A:

102 kg Emulsifiable epoxy resin (epoxy equivalent 190) (if desired with a defoaming agent of the silicone type)

50 kg Polyaminoimidazoline, amine number 380

120 kg Water, variable to desired consistency

B:

0–250 kg Water

EXAMPLE 2

Z:

1650 kg Aggregate sand up to 8 mm particle size 400 kg Portland cement 35 F

A:

40 kg Emulsifiable epoxy resin (epoxy equivalent 190)
20 kg with modified aliphatic polyamine (amine equivalent 83) (if desired with a defoaming agent of the silicone family)
150 kg Water, variable to desired consistency

B:

0–200 kg Water.

The reactive resins which may be used are a subgroup of the hardenable technologically exploited resins and duroplasts, i.e. thermosetting resins, of which epoxy resins are most preferable since they have the significant advantage that they are alkali resistant and thus can be used together with hydraulic (e.g. portland) cement. The concrete composition has the important advantage that it can be placed by the spray method.

I claim:

1. A method of placing a synthetic-resin-containing dry spray concrete having a synthetic resin and cement as binders, said method comprising the steps of:
    (a) feeding, by compressed air through a first inlet into a mixing body having a discharge nozzle at an end thereof, a dry mix of hydraulic cement and aggregate;
    (b) feeding through a second nozzle and separately from said dry mix into said body a mixture of an epoxy resin and water;
    (c) introducing a hardener for said epoxy resin into said body whereby said dry mix, said mixture of epoxy resin and water and said hardener are mixed intimately in said body to form a concrete mix;
    (d) discharging said concrete mix through said nozzle upon a substrate to deposit a concrete layer thereon; and
    (e) varying the proportions of resin and hydraulic cement in said mix reciprocally while maintaining substantially constant the total volume formed by the resin and the hydraulic cement.

2. A method of placing a synthetic-resin-containing dry spray concrete having a synthetic resin and cement as binders, said method comprising the steps of:
    (a) feeding, by compressed air through a first inlet into a mixing body having a discharge nozzle at an end thereof, a dry mix of hydraulic cement and aggregate;
    (b) feeding through a second nozzle and separately from said dry mix into said body a mixture of an epoxy resin and water;
    (c) introducing a hardener for said epoxy resin into said body whereby said dry mix, said mixture of epoxy resin and water and said hardener are mixed intimately in said body to form a concrete mix;
    (d) discharging said concrete mix through said nozzle upon a substrate to deposit a concrete layer thereon; and
    (e) varying the proportion of the resin in said mix during the deposit of said layer on said substrate and increasing the proportion of a hydraulic cement grout or water added to said mix as the resin proportion is decreased and vice versa.

3. A method of placing a synthetic-resin-containing dry spray concrete having a synthetic resin and cement as binders, said method comprising the steps of:
    (a) feeding, by compressed air through a first inlet into a mixing body having a discharge nozzle at an end thereof, a dry mix of hydraulic cement and aggregate;
    (b) feeding through a second nozzle and separately from said dry mix into said body a mixture of an epoxy resin and water;
    (c) introducing a hardener for said epoxy resin into said body whereby said dry mix, said mixture of epoxy resin and water and said hardener are mixed intimately in said body to form a concrete mix;
    (d) discharging said concrete mix through said nozzle upon a substrate to deposit a concrete layer thereon; and
    (e) continuously varying the resin proportion in said mix during the application of said layer upon said substrate.

4. The method defined in claim 3 wherein the resin proportion in said mix is greatest at the beginning of application of said layer to said substrate.

5. The method defined in claim 1, claim 2, claim 3 or claim 4 wherein said hardener is added in dry form to said dry mix.

6. The method defined in claim 1, claim 2, claim 3 or claim 4 wherein said hardener is added in liquid form together with the epoxy resin and water mixture through said second inlet.

7. The method defined in claim 1, claim 2, claim 3, or claim 4 wherein said hardener is added through a third inlet to said body.

8. A device for the dry spraying of a concrete composition in a layer upon a substrate, comprising:
    a tubular mixing body formed with a spray nozzle at one end thereof;
    means at the opposite end of said body for connecting same to a source of an aggregate containing dry component;
    means at an upstream location for feeding a first liquid component to said body for mixture with said dry component;
    means for feeding a second liquid component to said body at a downstream location ahead of said nozzle, a liquid reactive resin being supplied at least at one of said locations;
    respective valves connected with each of said locations for controlling the flow of said liquid components into said body; and
    control means for regulating the valves in a mutually dependent relationship.

* * * * *